(12) United States Patent
Brattberg

(10) Patent No.: US 8,972,118 B2
(45) Date of Patent: Mar. 3, 2015

(54) METHOD OF CONTROLLING AN INTERNAL COMBUSTION ENGINE AND A CONTROL UNIT FOR CONTROLLING AN INTERNAL COMBUSTION ENGINE

(75) Inventor: Björn Brattberg, Torshälla (SE)

(73) Assignee: Volvo Construction Equipment AB, Eskilstuna (SE)

( * ) Notice: Subject to any disclaimer, the term of this patent is extended or adjusted under 35 U.S.C. 154(b) by 292 days.

(21) Appl. No.: 13/508,064

(22) PCT Filed: Nov. 20, 2009

(86) PCT No.: PCT/SE2009/000499
§ 371 (c)(1),
(2), (4) Date: May 4, 2012

(87) PCT Pub. No.: WO2011/062526
PCT Pub. Date: May 26, 2011

(65) Prior Publication Data
US 2012/0221218 A1 Aug. 30, 2012

(51) Int. Cl.
*B60W 10/06* (2006.01)
*B60W 10/02* (2006.01)
*B60W 30/188* (2012.01)
*F02D 41/14* (2006.01)

(52) U.S. Cl.
CPC ............. *B60W 10/026* (2013.01); *B60W 10/06* (2013.01); *B60W 30/1882* (2013.01); *B60W 30/1884* (2013.01); *B60W 2710/0644* (2013.01); *B60W 2710/0677* (2012.01); *B60Y 2200/415* (2013.01); *F02D 41/1497* (2013.01)
USPC .............................................. 701/50; 701/54

(58) Field of Classification Search
CPC .................... F16H 2059/467; F16H 2059/743; F02D 2400/12
USPC .......................................................... 701/54
See application file for complete search history.

(56) References Cited

U.S. PATENT DOCUMENTS 4,484,497 A 11/1984 Hibino
4,716,999 A 1/1988 Tezuka et al.
(Continued)

FOREIGN PATENT DOCUMENTS

EP 0698017 A2 2/1996
WO WO 2009056953 A2 * 5/2009 .............. F16H 61/14

OTHER PUBLICATIONS

JP 63199959 A, Komatsu LTO, Aug. 18, 1988: (abstract)Retrieved from: PAJ database.
(Continued)

*Primary Examiner* — Khoi Tran
*Assistant Examiner* — Ryan Rink
(74) *Attorney, Agent, or Firm* — WRB-IP LLP

(57) ABSTRACT

A method of and a control unit arranged for controlling an internal combustion engine connected to a torque converter arranged to operate in a torque converter mode or a lock up mode are provided. The method includes determining whether the torque converter mode or the lock up mode is presently in operation and selecting to control an engine speed (N) in dependence of an operator input when the torque converter mode is present, and selecting to control an engine output power and/or engine output torque in dependence of operator input to the accelerator unit when the lock up mode is present.

23 Claims, 7 Drawing Sheets

(56) References Cited

U.S. PATENT DOCUMENTS

| | | |
|---|---|---|
| 5,095,776 A | 3/1992 | Sato |
| 5,101,786 A | 4/1992 | Kamio et al. |
| 5,150,635 A | 9/1992 | Minowa et al. |
| 5,176,118 A | 1/1993 | Norota |
| 5,257,193 A | 10/1993 | Kusaka et al. |
| 5,671,144 A * | 9/1997 | Ryan et al. ............ 701/84 |
| 6,165,102 A | 12/2000 | Bellinger |
| 6,512,971 B2 * | 1/2003 | Koumura et al. ............ 701/51 |
| 2001/0004722 A1 | 6/2001 | Kotwicki et al. |
| 2002/0038174 A1 * | 3/2002 | Koumura et al. ............ 701/51 |
| 2002/0107106 A1 | 8/2002 | Kato et al. |
| 2007/0207898 A1 | 9/2007 | Turpin et al. |
| 2010/0262346 A1 * | 10/2010 | Matsunaga et al. ............ 701/68 |

OTHER PUBLICATIONS

International Search Report from corresponding International Application PCT/SE2009/000499.

* cited by examiner

METHOD OF CONTROLLING AN INTERNAL COMBUSTION ENGINE AND A CONTROL UNIT FOR CONTROLLING AN INTERNAL COMBUSTION ENGINE

BACKGROUND AND SUMMARY

The present invention relates to a method of controlling an internal combustion engine connected to a torque converter having a lockup function. The invention also relates to a control unit for controlling an internal combustion engine. The invention furthermore relates to a vehicle drive train including such a control unit and a vehicle including such a drive train.

The invention is applicable on all vehicles having a torque converter with a lock up function. In particular the invention is applicable on working machines within the field of industrial construction machines, in particular wheel loaders and articulated haulers, where a transition between a torque converter mode and a lock up mode may be relatively frequent. Although the invention will be described with respect to a wheel loader, the invention is not restricted to this particular working machine, but may also be used in other working machines, such as dump trucks and trucks.

Vehicles provided with internal combustion engines connected to a torque converter are commonly known. Torque converters are used to transfer rotating power from the combustion engine to other drive train components of the vehicle.

A torque converter is able to multiply torque from the ingoing axle to the outgoing axle when there is a difference between the rotational speeds of the ingoing and outgoing axles. Hence torque converters are very useful especially for construction machines such as wheel loaders and articulated haulers for instance. However power is dissipated in a torque converter and the efficiency of torque converter is therefore limited. A typical efficiency curve defined in an efficiency/slip speed space displays a mid portion with an essentially flat curve characteristic with flanks with reduced efficiency. In the case the difference in rotational speed between ingoing and outgoing axles, which is commonly referred to as slip, is too small to allow operation of the torque converter at desired efficiency, it is common to allow engagement of a lock up coupling to mechanically connect the ingoing axle to the outgoing axle. It has shown to be suitable to operate the torque converter with a slip quota of between 0.5 and 0.8. This means that a quota of the rotational speed of the outgoing axle and the rotational speed of the ingoing axle is between 0.5 and 0.8.

The torque converter may thus include a lock up coupling for selective engagement or disengagement of a mechanical connection between said input and output shafts. The torque converter is a drive train component which transfers rotational power from a pump driven by an incoming axle to turbine connected to an outgoing axle via a stator which enables multiplication of the torque from the incoming axle to the outgoing axle while a slip is present. When the lock up coupling is engaged a mechanical connection between the incoming axle of the torque converter and the outgoing axle of the torque converter is present. The torque converter operates in lock up mode when the lock up coupling is engaged. When the lock up coupling is open no mechanical connection between the incoming axle of the torque converter and the outgoing axle of the torque converter is present.

Engagement or disengagement of the lock up function will have an impact on the load of the engine. When the lock up function is activated, i.e. the ingoing axle is mechanically connected to the outgoing axle of the torque converter, the transmission ratio over the torque converter is constant, preferably 1:1. In other words, in the lock up mode the torque converter function is deactivated.

When the lock up coupling is disengaged, variations in torque requirement for stable propulsion of the vehicle are met by variations on the slip in the torque converter. In this operation mode the primary object for the engine is to ensure that the engine operates at a stable engine speed requested by the driver. The combustion engine is therefore controlled to run at a desired engine speed in dependence of a position of an accelerator unit when a torque converter mode is present.

During the engagement process, the rotational speed of the engine will drop due to that a slip present before the engagement must be taken up until direct propulsion in engaged state will take place over the converter. If the engine speed is controlled in dependence of an operator input, the difference in rotational speed of the engine before the engagement process is initiated and after the engagement process is completed will be accounted for as a regulation error. Hence, a constant speed regulator will accelerate the engine at maximum torque.

When engagement of the lockup coupling take place engine load will increase simultaneously as the engine speed instantaneously drops due to that the engine is directly connected to the outgoing axle of the torque converter. The increased load of the engine together with a drop in engine speed will lead to an undesired behavior of the vehicle which will be subjected to a torque shock accelerating the vehicle.

Using state of the art engine speed regulation of the combustion engine will lead to acceleration of the vehicle at peak torque due to the lock up engagement, which leads to jerky behavior of the vehicle. The vehicle will therefore be difficult to control.

Attempts to reduce the torque shock resulting from engagement of a lock up clutch have been made in prior art. Many suggestions relate to adaptation of an EGR amount to allow reduction of the torque shock when engaging or disengaging the lock up clutch.

In U.S. Pat. No. 4,716,999 it is suggested to operate an air intake control valve in order to reduce the torque shock. It is suggested to close the control valve to reduce the amount of air to reduce the engine speed without decreasing the engine torque when engagement of the lock up clutch occurs.

In a corresponding manner disengagement of the lock up clutch leads to a sharp drop in load of the engine. The engine will simultaneously increase its speed due to the lowered load.

Even though various attempts to mitigate the occurrence of torque shock when engaging a lock up clutch have been made further improvements are necessary to provide method for controlling a combustion engine enabling good drive comfort during engagement and disengagement of the lock up function.

It is desirable to provide method for controlling a combustion engine enabling improved drive comfort during activation of a torque converter mode or activation of a lock up mode by engagement and disengagement of a lock up function.

The invention relates, according to an aspect thereof, to a method of controlling an internal combustion engine connected to a torque converter being arranged to operate in a torque converter mode or a lock up mode. According to an aspect of the inventive method it is first determined whether the torque converter mode or the lock up mode is activated. Depending on which mode the torque converter is operated in, a selection of how to control the combustion engine is made. When the lock up mode is present a control unit is set to control an engine output power and/or engine output torque in dependence of an operator input. When the torque converter mode is present, the control unit is set to select to control an engine speed in dependence of the operator input.

By controlling the output power and/or output torque of the combustion engine in dependence of an operator input, such as the position of an accelerator unit, when the lock up mode is present, the difference in engine speed is not dealt with as a regulation error which must be compensated by regulating the torque of the engine in order to reach the desired engine speed. Instead, the engine is controlled to deliver a requested power and/or torque. An undesired acceleration of the engine may therefore be avoided.

The operator input may be generated by an operator input to an accelerator unit such as an accelerator pedal, a manual lever or any other control instrument where an operator may control the operation of the engine.

In the lock up mode an amount of injected fuel may be regulated to provide a desired engine output power and/or torque as indicated by said operator input The operator input may be a position of an accelerator pedal or manual lever or similar. Once the operator input is determined, for instance via a sensor determining the position of the accelerator unit, a desired engine output power and/or torque may be determined by use of a map, a look up table or a function. Hence, the desired engine output power and/or torque may be determined from a present position of the accelerator unit.

In the torque converter mode an amount of injected fuel may be regulated to provide a desired engine speed indicated by said operator input to the accelerator unit. The operator input to the accelerator unit may be a position of an accelerator pedal or manual lever. Once the operator input is determined, for instance via a sensor determining the position of the accelerator unit, a desired engine speed may be determined by use of a map, a look up table or a function. Hence, the desired engine speed may be determined from a present position of the accelerator unit.

The invention furthermore relates to a control unit for controlling an internal combustion engine connected to a torque converter being arranged to operate in a torque converter mode or a lock up mode. The control unit includes a torque converter operation control block arranged to determine whether the torque converter mode or the lock up mode is activated. The control unit is arranged to control an engine output power and/or engine output torque in dependence of an operator input when said lock up mode is present. In the event the torque converter mode is present, the control unit is arranged to select to control an engine speed in dependence of operator input.

The merits of the control unit, the embodiments thereof, the vehicle drive train and the vehicle according to the invention are apparent from the description of the method above and from the description of the embodiments of the invention below.

BRIEF DESCRIPTION OF DRAWINGS

Embodiments and principles of the invention will be described in further detail below with references to appended drawings, where.

DETAILED DESCRIPTION

Figure 1:
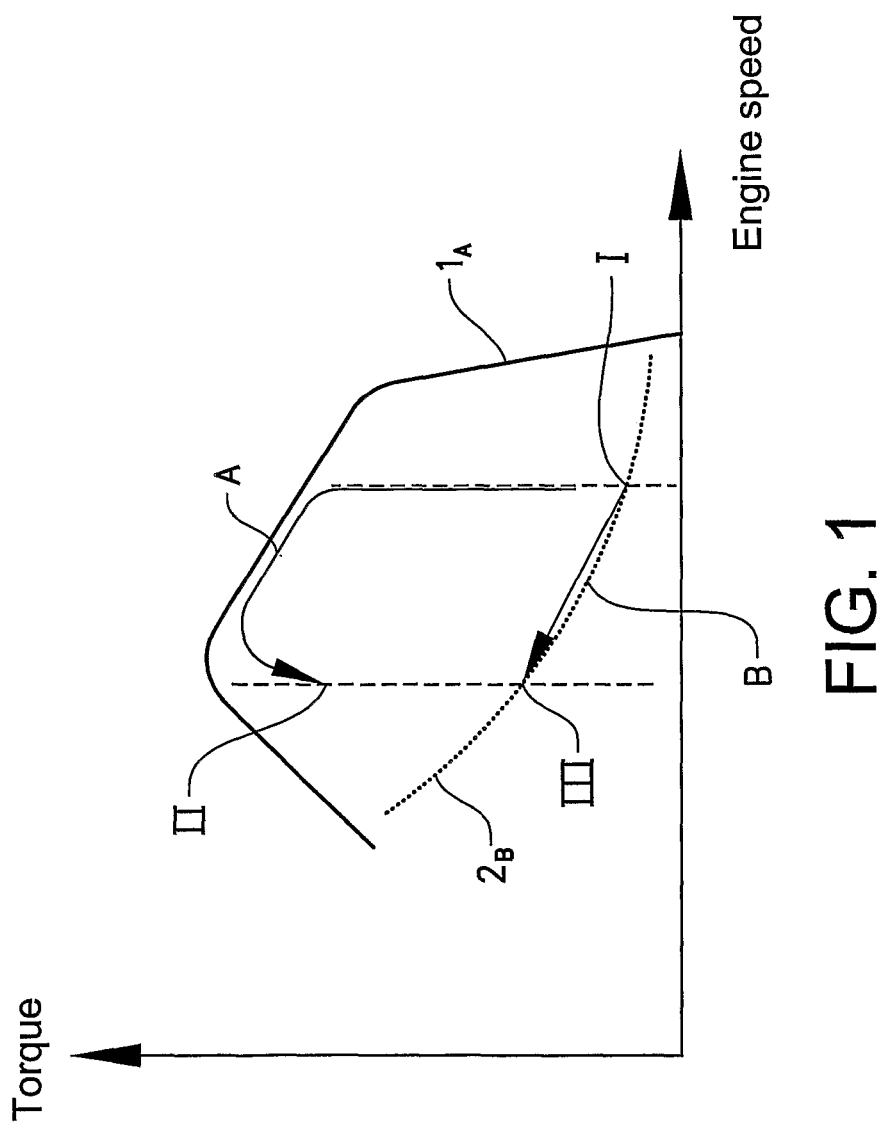
FIG. 1 shows in an engine torque/engine speed space, a comparison between a state of the art engagement process using an engine speed regulator and an engagement process using a shift from an engine speed regulator to an engine output power regulator in accordance with an embodiment of the invention.

FIG. 1 shows in an engine torque/engine speed space a comparison between a state of the art engagement process using an engine speed regulator and an engagement process using a shift from an engine speed regulator to an engine output power regulator in accordance with an embodiment of the invention.

The engagement process starts at initiation of a lock up between the incoming axle and outgoing axle of the torque converter by engagement of a lock up coupling and terminates when the lock up coupling is completely engaged.

In FIG. 1 a curve 1A indicates the maximum engine torque available. The figure also shows a curve 2B indicating the engine torque produced when operating the engine by an engine output power regulator. During regulation of the combustion engine by the engine output power regulator the torque of the engine is increasing with decreased engine speed to keep the delivered power constant during the engagement process.

It has been shown to be beneficial to control the combustion engine to keep the delivered power essentially constant during the engagement process.

In the event said lock up mode is present and an engine output power and torque regulator is controlling the engine output power and/or engine output torque in dependence of operator input to the accelerator unit, it is desirable to allow a contribution from the engine output power to have a larger impact on a regulation loop than a contribution from engine output torque. It may be suitable to control the engine output power in dependence of operator input to the accelerator unit without mapping any contribution of the torque component such that a pure power regulation is accomplished. Further descriptions of a combined power and torque regulator and a pure power regulator are provided in relation to the description of FIGS. 4 and 5.

In the event an engine speed regulator is used, the engagement process will follow the path A. Path A starts at point I defining a first engine speed and a first engine torque. Path A ends at an end point II defining a second engine speed and a second engine torque. The output power at the first point I is different from the engine output power at the end point II. Following path A the engine speed regulator forces the engine to run at maximum torque during the engagement process until the ingoing axle and outgoing axle rotates at the same speed and lock up is completed.

In the event an engine output power regulator is used, the engagement process will follow the path B. Path B starts at point I with a first engine speed and a first engine torque corresponding to a first engine output power. Path B ends at an end point III defined by a third engine speed and a third engine torque corresponding to a second engine output power. By using an output power regulator output power is substantially maintained during the engagement process.

During the engagement process of a lock up clutch, the difference between the rotational speed of the ingoing axle and the outgoing axle of the torque converter must be taken up such that both axles rotate at the same rotational speed. Prior to engagement, the outgoing axle rotates at a lower rotational speed than the ingoing axle. During engagement the rotational speeds are matched by acceleration of the outgoing axle and retardation of the ingoing axle. When the torque converter is installed in a vehicle such as a dumper or wheel loader, the size and weight of the vehicle affects the relationship between the acceleration of the outgoing axle to the retardation of the ingoing axle such that the retardation of the ingoing axle is considerably larger than the acceleration of the outgoing axle.

An integral over the area below respective curve A and B and over the time corresponds to the work developed during the engagement process, that is: $W=\int\int TdNdt$, where T denotes the torque, N the engine speed and t the time.

Most of the work developed in the run in process is dissipated in the torque converter and will result in wear of the lock up clutch and heating of the converter.

For this reason, it is beneficial to control the engine output power and/or torque in dependence of operator input to the accelerator unit during the engagement process since less energy will be dissipated resulting in lower wear of the component.

Hence, in an embodiment of the invention the shift between a control mode of the combustion engine where the engine speed is controlled in dependence of an operator input to an accelerator unit and a control mode of the combustion engine where the engine output power and/or torque is controlled in dependence of operator input to the. accelerator unit takes place before complete engagement of the lock up coupling. Preferably the shift of the control mode takes place at initiation or in the beginning of the of the engagement process.

The lock up mode may therefore encompass a lockup process starting from initiation of engagement of a lock up coupling to completion of engagement of the lockup coupling.

In order to match the operating conditions of the vehicle before and after the engagement or disengagement of a lock up coupling, it is preferred to control the combustion engine output power in dependence of an operator input in the lock up mode. That is the regulator should use an operator input to determine a desired delivered power from the combustion engine in the lock up mode. Hence, the map for the power regulator or power and torque regulator should be formed such that a desired engine output power delivered by the engine immediately after an engagement process is completed may be set to be substantially the same as a power delivered by the torque converter immediately prior to start of a lockup process, in the event an operator maintains a constant input to the accelerator unit during the engagement process. This means that both requirements that the delivered power by the combustion engine Poeiivered after engagement should be equal to the delivered power by the torque converter before engagement and that the desired power by the combustion engine Poesired after engagement by assumption on constant accelerator unit position, should be equal to the delivered power by the torque converter before engagement Therefore, the driving condition at which engagement of the lock up coupling is engaged may be selected such that the power delivered by the torque converter immediately prior to start of the engagement process is substantially the same as the power delivered by the engine immediately after the engagement process is completed.

This may be expressed as $$(T_{converter} * n_{converter})_{before\ lockup} \approx (T_{engine} * n_{engine})_{after\ lockup},$$

where Tconverter equals the torque delivered by the torque converter, nconverter is the rotational speed of the converter before the engagement process has started, Tengine is the torque delivered by the engine after the engagement process is completed, and nengine is the rotational speed of the engine after the engagement process is completed.

The requirement of that the power delivered by the torque converter immediately prior to start of the engagement process is substantially the same as the power delivered by the engine immediately after the lockup process is completed is fulfilled if any difference in the power delivered by the torque converter and torque delivered by the combustion engine is not noticeable for a driver. An acceptable difference in the power delivered by the torque converter before lockup and the power delivered by the engine after lock up is less than 8%, preferably less than 4%.

The desired engine output power delivered by the engine during the engagement process may be substantially constant.

Figure 2:
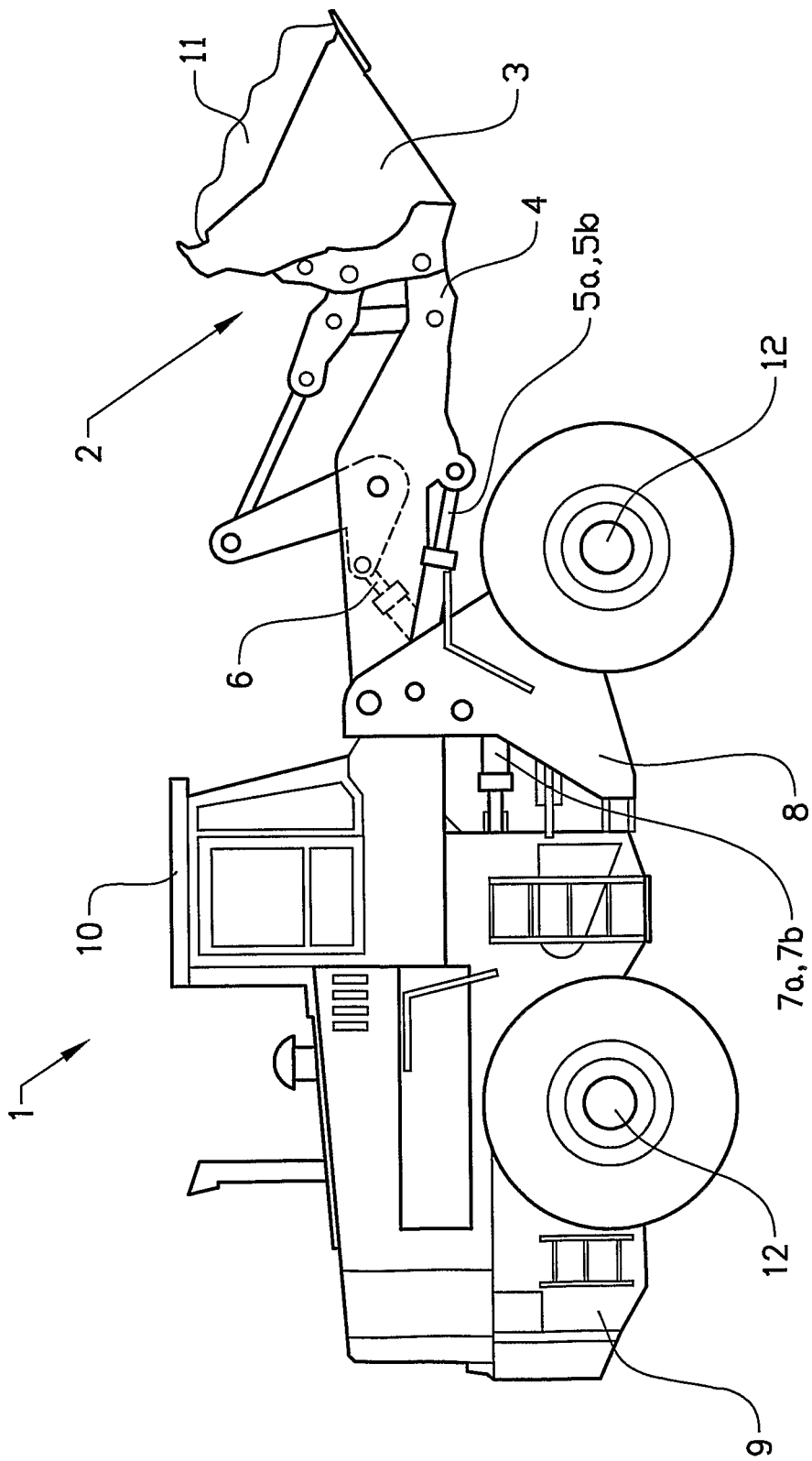
FIG. 2 is a lateral view illustrating a wheel loader having a bucket for loading operations, and a hydraulic system for operating the bucket and steering the wheel loader.

FIG. 2 is an illustration of a wheel loader 1 having an implement 2 in the form of a bucket 3. The bucket 3 is arranged on an arm unit 4 for lifting and lowering the bucket 3, and further the bucket 3 can be tilted or pivoted relative to the arm unit 4. The wheel loader 1 is provided with a hydraulic system comprising at least one hydraulic pump (not shown in FIG. 2) and working cylinders 5a, 5b, 6 for the operation of the arm unit 4 and the bucket 3.

Furthermore, the hydraulic system comprises working cylinders 7a, 7b for turning the wheel loader by means of relative movement of a front body 8 and a rear body 9.

Figure 3:
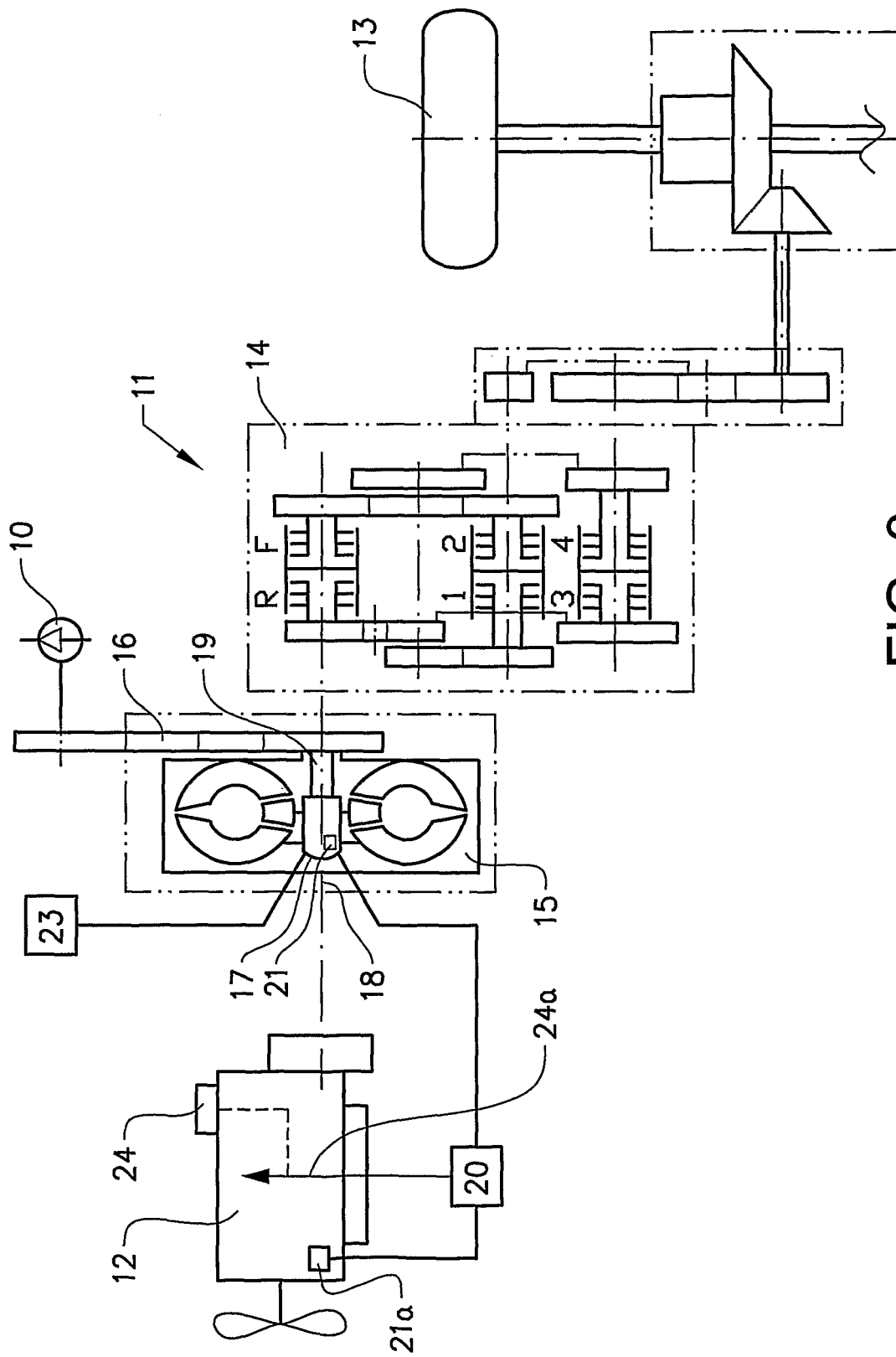
FIG. 3 is a schematic illustration of a transmission line of a wheel loader.

FIG. 3 is a schematic illustration of a transmission line 11 of a wheel loader 1. At one end of the transmission line 11 an internal combustion engine 12 is arranged. The other end of the transmission line 11 is coupled to ground engagement elements such as the driving wheels 13 of the wheel loader 1, for example. The internal combustion engine 12 supplies torque to the driving wheels 13 of the wheel loader 1 via the transmission line 11.

As illustrated, the transmission line 11 may comprise a gearbox 14 for varying the speed of the vehicle 1, and for changing between forward and backward driving direction of the wheel loader 1. A torque converter 15 is arranged between the internal combustion engine 12 and the gearbox 14. The torque converter includes a lock up coupling 17, which may be controlled to connect an incoming axle 18 to be mechanically connected to an outgoing axle 19 such that a stiff connection exist between the two axles.

The transmission line 11 of the wheel loader 1 has means for driving a hydraulic pump 10 in a hydraulic system for lifting operations and steering the wheel loader 1. The hydraulic pump 10 may driven by the internal combustion engine 12, preferably via.gear wheels 16 arranged between the torque converter 15 and the gearbox 14.

The combustion engine 12 is controlled by a control unit 20 controlling the operation of the combustion engine. The control unit 20 receives input data from a sensor system 21 a in order to control the operation of the combustion engine and its operation parameters, such as fuel injection timing and amount, EGR recycling if present, valve timing if controllable, intake pressure, operation of superchargers, engine speed and engine torque as is conventional in the art of control of combustion engines. In addition the control unit receives information about the engagement status of the lock up coupling 17. The information about the engagement status may be retrieved from a sensor 21 sensing the engagement status of the lock up clutch or from operation commands of a controller 23 which engages or disengages the lock up coupling 17 in dependence of the operating condition of the vehicle, combustion engine, gear box and torque converter, as is conventional in the art. A vehicle drive train includes the combustion engine, the drive line 11 and the driving wheels 13.

Using the information from the sensor system, the control unit transmits control signals via a communication link 24a to various actuators enabling control of the engine 12. The control of the combustion engine in particular includes control of fuel injection to the respective cylinders of the combustion engine. A fuel injection control system 24 is schematically indicated.

Figure 4:
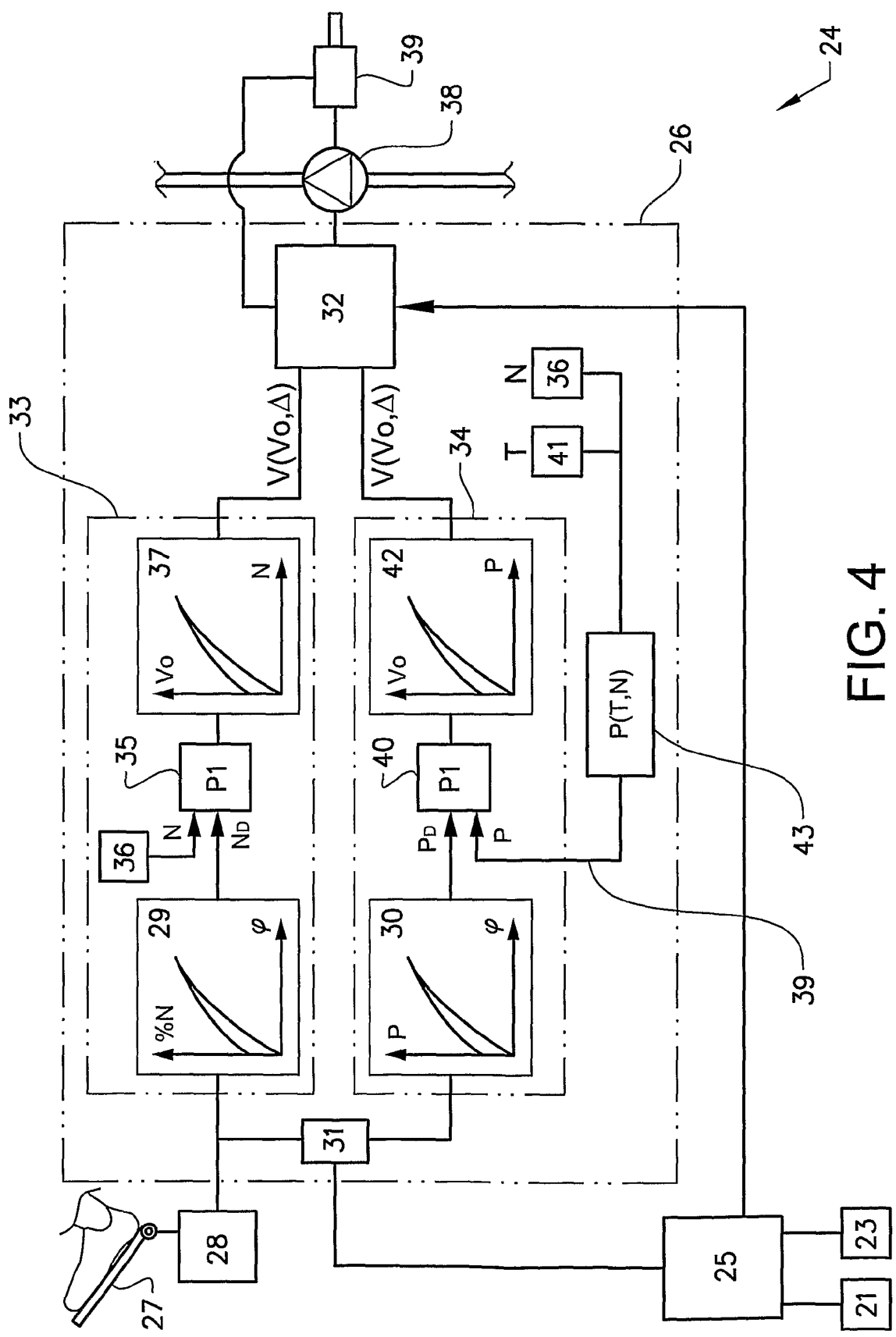
FIG. 4 shows parts of a control unit and its connection to schematic fuel injection system.

FIG. 4 shows a parts of a control unit and its connection to schematic fuel injection system. The control unit includes a torque converter operation control block 25 arranged to determine whether a torque converter mode or a lock up mode is presently in operation.

In the embodiment shown in FIG. 4 the regulator is based on an input signal from an operator indicating a desired engine output power when operating in lock up mode.

When the lock up coupling 17 is engaged a mechanical connection between the incoming axle 8 of the torque converter and the outgoing axle 19 of the torque converter is present. The torque converter operates in lock up mode when the lock up coupling is engaged.

When the lock up coupling 17 is open no mechanical connection between the incoming axle 18 of the torque converter and the outgoing axle 19 of the torque converter is present. The torque converter operates in torque converter mode when the lock up coupling is disengaged.

Preferably, the lock up mode may encompass a lockup process starting from initiation of engagement of a lock up coupling to completion of engagement of the lockup coupling.

Operational status of the torque converter, that is whether the torque converter operates in lock up mode or torque converter mode, may be derived from the sensor 21 or from the torque converter controller 23.

The control unit furthermore includes a fuel injection control block 26. The fuel injection control block 26 receives an input signal from an accelerator unit 27. The accelerator unit 27 may be an accelerator pedal or a manual instrument. The position $\phi$ of the accelerator unit 27 as indicated by said operator input to the accelerator unit may be determined by a sensor 28.

Based on the sensor signal corresponding to the position $\phi$ of the accelerator unit 27 a desired engine speed N may be determined in a desired engine speed determination control block 29. The desired engine speed determination control block 29 may be provided in the form of a map, look up table or function providing a desired output power from a sensor signal indicating an operator input to the accelerator unit 27

Based on the sensor signal a desired engine output power PDesired may be determined in a desired output power determination control block 30. The desired output power determination control block 30 may be provided in the form of a map, look up table or function providing a desired output power from a sensor signal indicating an operator input to the accelerator unit 27.

A selector 31 may determine which of the control blocks 29 or 30 should be operative to generate a fuel injection setpoint in a fuel injection volume controller 32, alternatively, the torque converter operation control block 25 may directly communicate with the fuel injection volume controller 32 for discarding signals from one of an engine speed regulator 33 or engine output power regulator 34 included in the control unit. The selection on which of the control blocks 29, 30 should be operative is made based on whether the lock up mode or the torque converter mode is present.

A fuel injection setpoint v(v0,Δ) is being dependent on a basemap volume v0 and a regulator correction Δ. The fuel injection setpoint corresponds to an injected fuel volume V.

The desired engine speed determination control block 29 generates an input signal corresponding to a desired engine speed NDesired to the engine speed regulator 33. The engine speed regulator 33 may include a proportional and integrating regulator unit 35 as is common in the art which additionally receives an input signal from an engine speed sensor 36 to determine the difference between a desired engine speed Noesired and an actual engine speed N. The engine speed regulator 33 furthermore includes a base map 37 where information about a base amount of fuel to be injected is stored. From the information about the base amount and a correction value formed by the regulator unit 35 a setpoint for a fuel injection is determined in fuel injection volume controller 32. The setpoint may include settings of a fuel pump 38 or opening times for a fuel injector 39.

The desired engine output power determination control block 30 generates an input signal corresponding to a desired engine output power PDesired to the engine output power regulator 34. The engine output power regulator 34 may include a proportional and integrating regulator unit 40 as is common in the art which additionally receives an input signal from an engine speed sensor 36 and engine torque sensor 41 to determine the difference between a desired engine output power PDesired and a delivered engine output power PDelivered. The engine speed sensor and engine torque sensor may communicate with a control block 43 determining the output engine power P(T, N) Delivered. The engine output power regulator 34 furthermore includes a base map 42 where information about a base amount of fuel to be injected is stored. From the information about the base amount and a correction value formed by the regulator unit 40 a setpoint for a fuel injection is determined in fuel injection volume controller 32. The setpoint may include settings of a fuel pump 38 or opening times for a fuel injector 39.

In accordance with the invention the controller includes an engine speed regulator arranged to control the engine speed in dependence of an accelerator pedal position and an engine output power regulator arranged to control the engine output power in dependence of an accelerator pedal position. The controller is arranged to select to control the combustion engine by said engine speed regulator when said lock up clutch is disengaged and said controller is arranged to select to control the combustion engine by said engine output power regulator when said lock up clutch is engaged.

The control unit hence includes two separate control regulators controlling the combustion engine in relation to the accelerator pedal position. The control regulators may be implemented in software. Such implementation may be performed as a regulator loop which may be defined by mapping or by regulation algorithms or by a combination thereof as is common in the art. The control regulator may also be implemented in hardware, specifically as a fuel supply regulator including mechanical control of the amount of supplied fuel to the engine. Two different fuel supply branches may be provided. A first branch includes an engine speed regulator which allows control of a deplacement of a fuel pump in relation to the speed of the engine. A second branch includes a fuel amount regulator where the displacement of the fuel pump is controlled in dependence of the position of the accelerator pedal. The branches may be united in a selector valve, selecting which branch should be connected to the fuel injector. The selector valve may suitable be a shift valve controlled by the pressure controlling engagement and disengagement of the lock up clutch.

Figure 5:
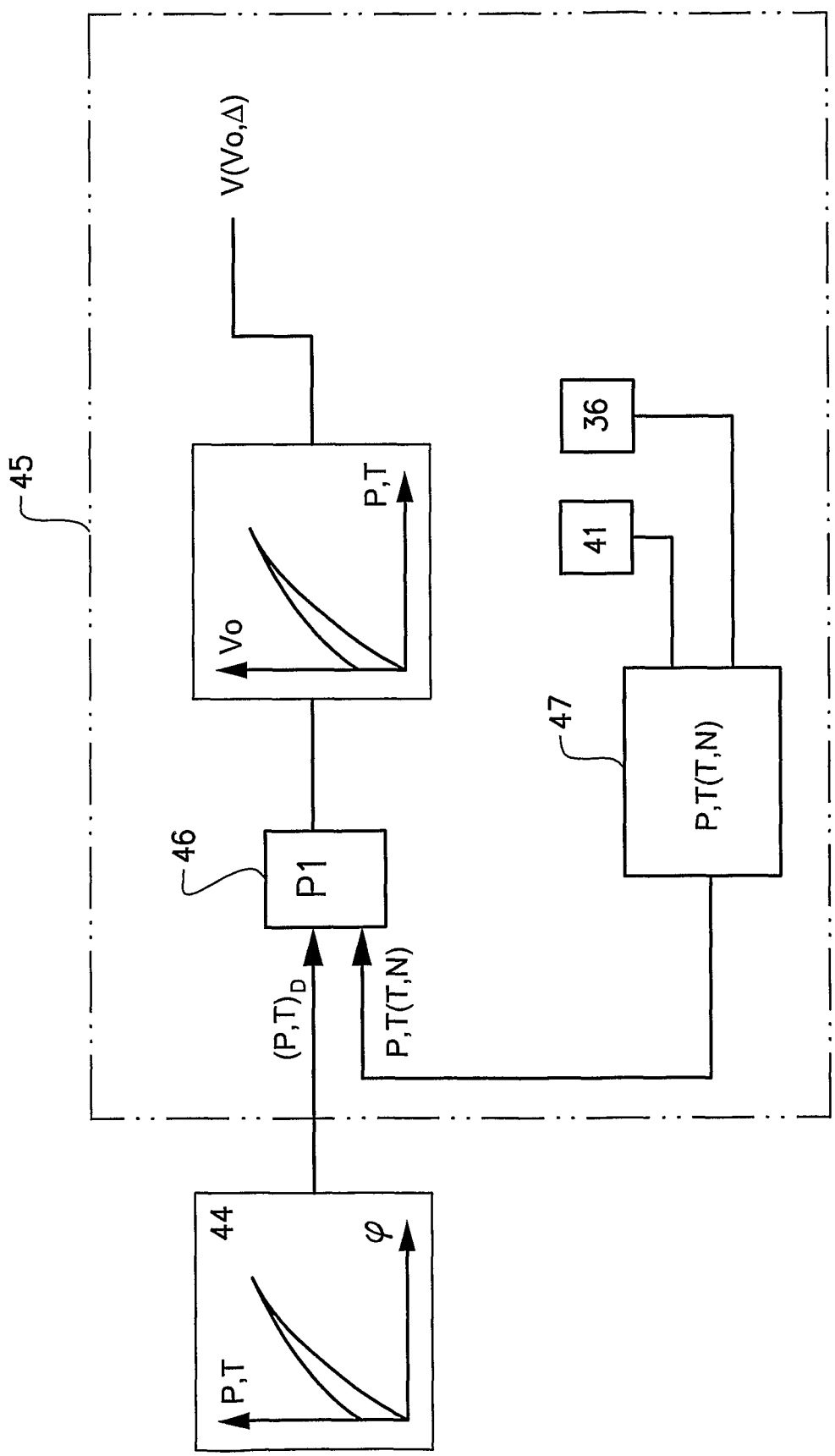
FIG. 5 shows a general format of an desired engine power and torque determination control block and an engine output power and output torque regulator.

In FIG. 5 a more general form of a controller for a combustion engine operable in a lock up mode is shown. A desired engine output power and torque determination control block 44 generates an input signal to an engine output power and torque regulator 45. In the desired engine output power and torque determination control block 44 a desired engine output power and torque P.TDesired is determined from an input of an operator to the accelerator unit 27 via a map or a function defined in the engine output power and torque determination control block 44. The engine output power and torque regulator 45 may include a proportional and integrating regulator unit 46 as is common in the art which additionally receives an input signal from an engine speed sensor 36 and engine torque sensor 41 to determine the difference between a desired engine output power and a delivered engine output power. The engine speed sensor and engine torque sensor may communicate with a control block 47 determining the output engine power and output engine torque, P.TDeiivered—The engine output power and torque regulator 45 furthermore includes a base map 48 where information about a base amount of fuel to be injected is stored. From the information about the base amount and a correction value formed by the regulator unit 46 a setpoint for a fuel injection is determined in fuel injection volume controller 32. The setpoint may include settings of a fuel pump 38 or opening times for a fuel injector 39.

The desired engine output power and torque P.TDesired may be in the format: $K=\alpha P(\phi)+\beta T(\phi)$, where $\alpha$, $\beta$ are weight functions or coefficients. P is a dimensionless normed engine output power and T is a dimensionless normed engine output torque.

Preferably $\alpha$ is considerably larger than $\beta$ in situations close to engagement and disengagement of the lock up coupling. With situations close to engagement and disengagement of the lock up coupling is intended a torque/engine speed space encompassing the torque and rotational speeds of the combustion engine at which engagement and disengagement of the lock up clutch takes place. This torque/engine speed space includes at least the complete engagement and disengagement process.

It may be suitable that $\alpha/\beta>10$, preferably $>20$ for allowing engagement and disengagement of the lock up coupling to be essentially free from torque shocks.

Hence the regulator may be selected such that the operator input substantially solely controls a delivered engine output power (P)Delivered when said lock up mode is activated.

It may be particularly suitable to set $\beta=0$ to provide a pure engine output power regulation in the lock up state.

In an alternative embodiment a can be set to be equal to 0, even though a transition between the lock up and torque converter modes will less smooth, the forced acceleration due to a regulation error present when using solely an engine speed regulator will not be present.

The desired engine output power delivered by the engine immediately after an engagement process is completed may be set to be substantially the same as a power delivered by the torque converter 15 immediately prior to start of an engagement process.

The torque converter controller 23 controls engagement and disengagement of the lock up coupling 17 in dependence of the driving condition. The driving condition may include available output torque from the combustion engine, engine speed available torque from the torque converter, rotational speed of the torque converter for instance. The time of engagement of the lock up coupling 17 is engaged may be selected such that the power delivered by the torque converter 15 immediately prior to start of the engagement process is substantially the same as the power delivered by the engine 12 immediately after the engagement process is completed.

This may be expressed as $$(T_{converter} * n_{converter})_{before\ lockup} \approx (T_{engine} * n_{engine})_{after\ lockup},$$

where Tconverter equals the torque delivered by the torque converter 15, riconverter is the rotational speed of the converter 15 before the engagement process has started, Tengine is the torque delivered by the engine 12 after the engagement process is completed, and nengine is the rotational speed of the engine 12 after the engagement process is completed.

The requirement of that the power delivered by the torque converter 15 immediately prior to start of the engagement process is substantially the same as the power delivered by the engine 2 immediately after the lockup process is completed is fulfilled if any difference in the power delivered by the torque converter and torque delivered by the combustion engine is not noticeable for a driver. An acceptable difference in the power delivered by the torque converter before lockup and the power delivered by the engine after lock up is less than 8%, preferably less than 4%.

The desired engine output power delivered by the engine during the engagement process may be substantially constant.

Figure 6:
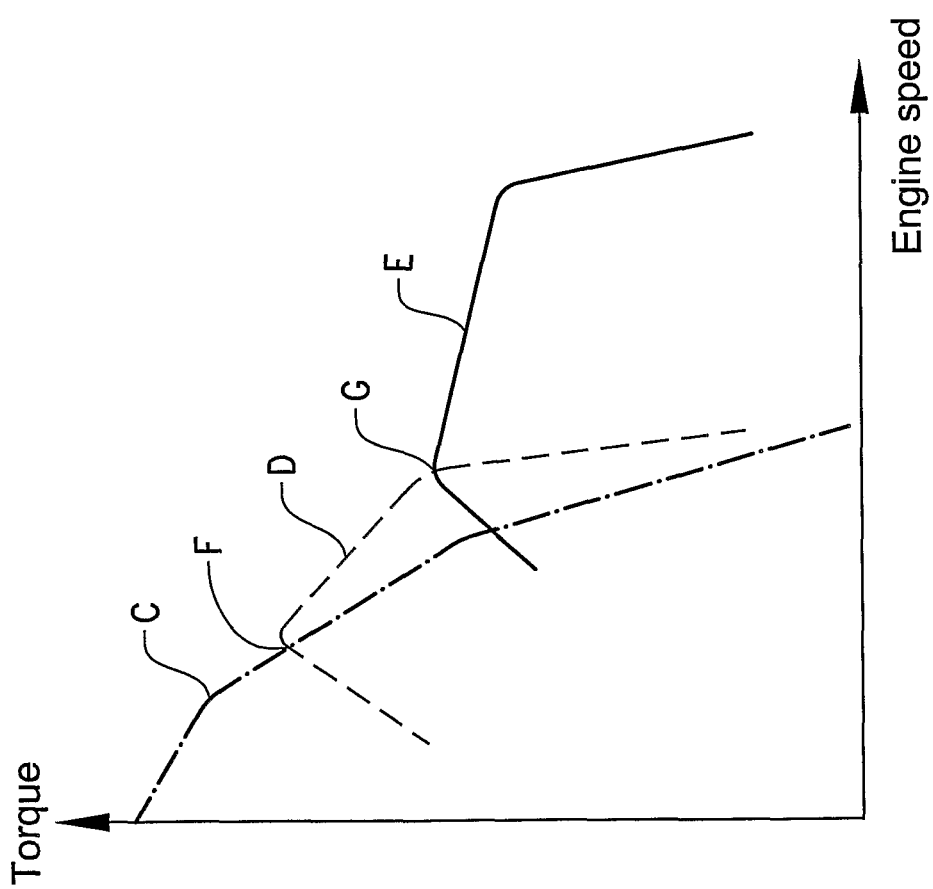
FIG. 6 shows a schematic view of maximum torque developed by the torque converter and from the combustion engine when the second and third gears are engaged.

FIG. 6 shows a schematic view of maximum torque developed by the torque converter and from the combustion engine when the second and third gears are engaged. The diagram shows in an engine torque engine speed space, a first curve C maximum torque provided by the torque converter when second gear is engaged, a second curve D showing the maximum engine torque at second gear with lock up coupling engaged, and a third curve E showing the maximum engine torque at third gear. A lockup coupling engagement and disengagement point F is present where curve C intersects curve D and a gear shift point G is present where curve D intersects curve E. The engagement and disengagement of the lock up clutch is selected at the point where the maximum torque curve for the converter intersects with the maximum torque curve for a gear. In this example it is shown for the second gear. Furthermore the engagements points for the torque converter lockup clutch are selected such that if a setting of the accelerator pedal is maintained during the engagement process, the power developed by the torque converter will be substantially the same as the power developed by the combustion engine at the setpoint indicated by the accelerator pedal when controlling the combustion engine with an output power regulator.

Preferably, the change from the control of the combustion engine by the engine speed regulator to the engine output power regulator occurs when a pressure in a lockup engagement hydraulic circuit starts to build up for engagement of the lock up clutch. Hence change occurs at or prior to start of an engagement process. Going in the other direction, the shift of the regulator for controlling the combustion engine occurs when a decision to release the lockup has been taken, that is at or immediately prior to start of a disengagement process. In the event the switch of the regulator does not start immediately before start of the disengagement process it may be suitable to provide the switch over to the engine speed regulator occurs within 100 ms, preferably within 50 ms from the start of the disengagement process.

Figure 7:
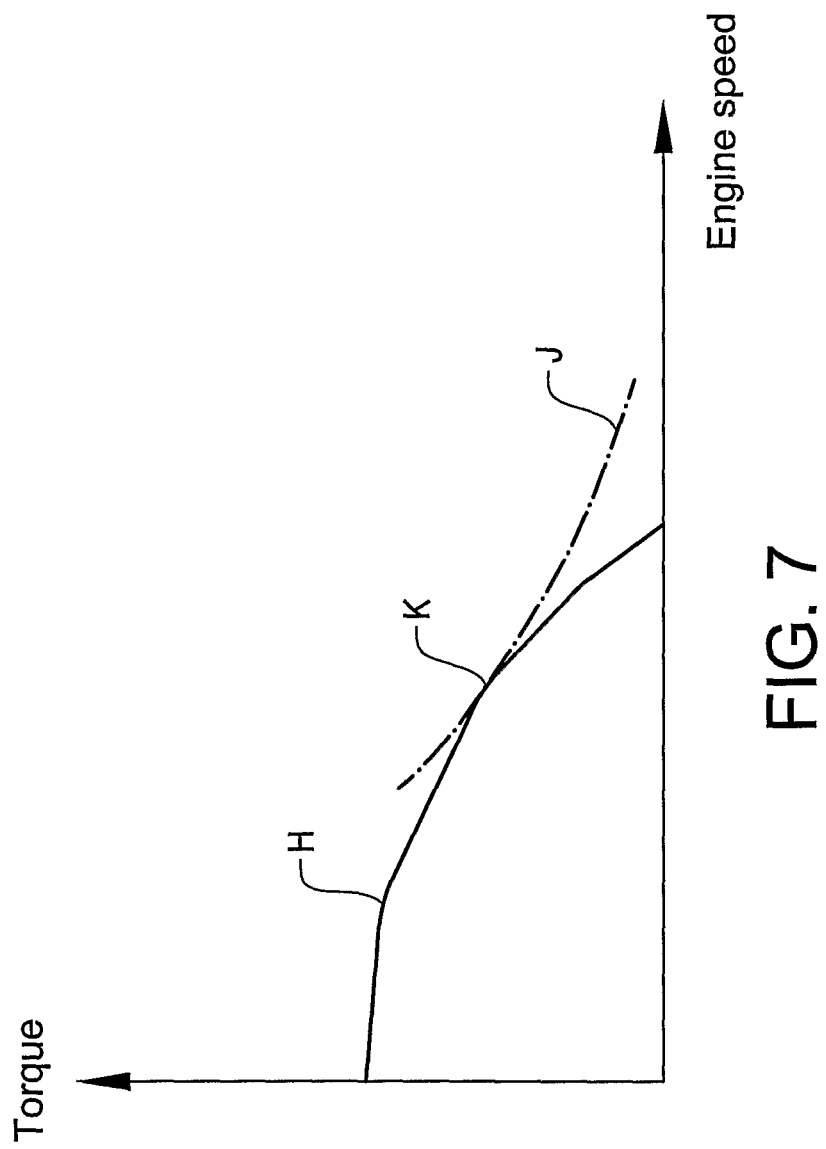
FIG. 7 shows a shift strategy in an engine speed torque space.

FIG. 7 shows a shift strategy from and a lock up mode to a torque converter mode, and vice versa in an engine speed torque space. The figure shows a curve H representing the available converter torque at partial load and a curve J representing engine torque available at partial load. Lock up engagement and disengagement is planned to take place at an operation point K where the two curves H and J intersect or are tangential to each other. The engagement and disengagement will be more comfortable for the operator, particularly at partial load ranging up to 75% load. The shift can therefore be scheduled at lower engine speed without presence of engagement hunting.

The fuel consumption of a vehicle making use of the control strategy according to the invention may be reduced. A reason for this is that the position for disengagement and engagement of a lock up coupling may take place at lower engine speeds than in prior art arrangements. Hence operation at lower engine speeds where the internal losses in the combustion engine are lower may be accomplished.

A further difference between prior art systems which maintains control of the engine with an engine speed regulator after the engagement of lock up clutch and a system according to the invention where control of the engine with an engine output power and torque regulator during and after the engagement of lock up clutch is that an engine speed regulator will continue to control the combustion engine at maximum engine torque until the requested engine speed is met. This leads to acceleration of the vehicle unless the operator compensates by changing the pedal position under and after the engagement process. If however an engine output power regulator is used, the engine will be controlled to maintain the output power during run in and completion of the engagement as well as after the engagement process has been completed. This allows for stable operating conditions of the vehicle with improved driver comfort.

In the event the gear box has large steps in gear ratios, typically around 2.1-1.9, it has shown that it is beneficial to allow disengagement of the lock up clutch during gear changes, in the event sufficient torque should not be present for driving in lock up state after the gear change has been completed. In the event the gear box has small steps gear ratios, typically around 1.3, it is beneficial to allow the lock up coupling to maintain its engagement status at gear change. With a step in gear ratio is here intended a ratio between the gear ratio of a first higher gear and a second lower neighboring gear.

The use of the controller for the combustion engine according to the present invention has proved to be beneficial since gear change can take place with a sharp acceleration of the ingoing axle to meet a requested desired engine rotational speed. This allows for a quick build up of a slip over the torque converter to allow torque to be transmitted over the converter.

The invention also relates to a vehicle drive train arrangement including a combustion engine, said combustion engine having an output shaft connected to an input shaft of a torque converter, which torque converter has an output shaft connected to a drive train for a ground engaging element. The torque converter furthermore including a lock up coupling for selective engagement or disengagement of a mechanical connection between said input and output shafts. A controller for controlling the operation of the combustion engine is provided. The controller includes an engine speed regulator arranged to control the engine speed in dependence of an accelerator pedal position and an engine output power regulator arranged to control the engine speed in dependence of an accelerator pedal position. The said controller is arranged to select to control the combustion engine by said engine speed regulator when said lock up coupling is disengaged and said controller is arranged to select to control the combustion engine by said engine output power regulator when said lock up coupling is engaged.

Even though the embodiments herein have been described with regulators for regulating the engine speed and engine output power and/or torque via regulation of the injected fuel only, any other regulator system for regulating the engine speed and the engine output power and/or torque known in the art may be contemplated.

The invention claimed is:

1. A method of controlling an internal combustion engine connected to a torque converter being arranged to operate in a torque converter mode or a lock up mode, comprising
determining whether the torque converter mode or the lock up mode is presently activated,
selectively controlling at least one of an engine output power and engine output torque, by an engine output power regulator of a fuel injection control system, in response to an operator input when the lock up mode is activated, and
selectively controlling an engine speed, by an engine speed regulator of the fuel injection control system, in response to the operator input when the torque converter mode is activated.

2. A method according to claim 1, wherein in the lock up mode an amount of injected fuel into the engine is regulated to provide at least one of a desired engine output power and engine output torque as indicated by the operator input.

3. A method according to claim 1, wherein in the lock up mode, the at least one of the desired engine output power and engine output torque is determined from a present position of an accelerator unit.

4. A method according to claim 1, wherein in the torque converter mode an amount of injected fuel into the engine is regulated to provide a desired engine speed as indicated by the operator input.

5. A method according to claim 1, wherein in the torque converter mode, the desired engine speed is determined from a present position of an accelerator unit.

6. A method according to claim 1, wherein in the lock up mode the at least one of the engine output power and engine output torque is controlled by an engine output power and torque regulator where a contribution from engine output power (P) has a larger impact on a regulation loop in the engine output power and torque regulator than a contribution from engine output torque.

7. A method according to claim 1, wherein the operator input solely controls a delivered engine output power when the lock up mode is activated.

8. A method according to claim 1, wherein the lock up mode encompasses an engagement process starting from initiation of engagement of a lock up coupling to completion of engagement of the lockup coupling.

9. A method according to claim 8, wherein the desired engine output power from the engine immediately after the lockup process is completed is set to be substantially the same as a power delivered from the torque converter immediately prior to start of the lockup process.

10. A method according to claim 8, wherein the operator input solely controls a delivered engine output power when the lock up mode is activated, comprising controlling the delivered engine output power from the engine during the engagement process to be substantially constant.

11. A control unit for controlling an internal combustion engine connected to a torque converter being arranged to operate in a torque converter mode or a lock, up mode, wherein the control unit includes a torque converter operation control block arranged to determine whether the torque converter mode or the lock up mode is presently activated, in that the control unit is arranged to selectively control at least one of an engine output power and engine output torque, by an engine output power regulator of a fuel injection control system, in response to an operator input when the lock up mode is present, and in that the control unit is arranged to selectively controlling an engine speed, by an engine speed regulator of the fuel injection control system, in response to the operator input when the torque converter mode is present.

12. A control unit according to claim 1, wherein the control unit is arranged to regulate, in the lock up mode, an amount of fuel injected to the engine to provide at least one of a desired engine output power and engine output torque as indicated by the operator input.

13. A control unit according to claim 11, wherein in the lock up mode the control unit is arranged to determine the at least one of the desired engine output power and engine output torque from a present position of an accelerator unit.

14. A control unit according to claim 11, wherein in the torque converter mode the control unit is arranged to regulate an amount of fuel injected into the engine to provide a desired engine speed as indicated by the operator input.

15. A control unit according to claim 11, wherein in the torque converter mode the control unit is arranged to determine the desired engine speed from a present position of an accelerator unit.

16. A control unit according to claim 11, wherein the control unit is arranged to control the at least one of the engine output power and engine output torque by allowing a contribution from engine output power to have a larger impact on a regulation loop than a contribution from engine output torque.

17. A control unit according to claim 11, wherein the operator input solely controls an engine output power when the lock up mode is activated.

18. A control unit according to claim 11, wherein the lock up mode encompasses a lockup process starting from initiation of engagement of a lock up coupling to completion of engagement of the lockup coupling.

19. A control unit according to claim 11, wherein the control unit is arranged to control the delivered engine output power delivered from the engine immediately after the lockup process is completed to be substantially the same as a power by the torque converter immediately prior to start of the lockup process.

20. A control unit according to claim 18, wherein the operator input solely controls a delivered engine output power when the lock up mode is activated, wherein the delivered engine output power from the engine during the lock up process is substantially constant.

21. A vehicle drive train including a combustion engine and a torque converter, wherein the combustion engine is controlled by a control unit for controlling an internal combustion engine connected to a torque converter being arranged to operate in a torque converter mode or a lock up mode, wherein the control unit includes a torque converter operation control block arranged to determine whether the torque converter mode or the lock up mode is presently activated, in that the control unit is arranged to selectively control at least one of an engine output power and engine output torque, by an engine output power regulator of a fuel injection control system, in response to an operator input when the lock, up mode is present, and in that the control unit is arranged to selectively control an engine speed by an engine speed regulator of the fuel injection control system, in response to the operator input when the torque converter mode is present.

22. A vehicle including a vehicle drive train including a combustion engine and a torque converter, wherein the combustion engine is controlled by a control unit for controlling an internal combustion engine connected to a torque converter being arranged to operate in a torque converter mode or a lock up mode, wherein the control unit includes a torque converter operation control block arranged to determine whether the torque converter mode or the lock up mode is presently activated, in that the control unit is arranged to selectively control at least one of an engine output power and engine output torque, by an engine output power regulator of a fuel injection control system, in response to an operator input when the lock up mode is present, and in that the control unit is arranged to selectively control an engine speed, by an engine speed regulator of the fuel injection control system, in response to the operator input when the torque converter mode is present.

23. A software product stored on a non-transient data carrier, the software product being executable on computing hardware for performing a method of controlling an internal combustion engine connected to as torque converter being arranged to operate in a torque converter mode or a lock up mode, comprising
  determining whether the torque converter mode or the lock up mode is presently activated,
  selectively controlling at least one of an engine output power and engine output torque, by an engine output power regulator of a fuel injection control system, in response to an operator input when the lock up mode is activated, and
  selectively controlling an engine speed by an engine speed regulator of the fuel injection control system, in response to the operator input when the torque converter mode is activated.

* * * * *